United States Patent
Stewart et al.

(10) Patent No.: US 12,032,949 B2
(45) Date of Patent: Jul. 9, 2024

(54) DELETION OF FIRMWARE INSTRUCTIONS

(71) Applicant: Hewlett-Packard Development Company, L.P., Spring, TX (US)

(72) Inventors: Christopher H. Stewart, Spring, TX (US); Valiuddin Ali, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 338 days.

(21) Appl. No.: 17/296,526

(22) PCT Filed: Feb. 11, 2019

(86) PCT No.: PCT/US2019/017522
§ 371 (c)(1),
(2) Date: May 24, 2021

(87) PCT Pub. No.: WO2020/167286
PCT Pub. Date: Aug. 20, 2020

(65) Prior Publication Data
US 2022/0027074 A1   Jan. 27, 2022

(51) Int. Cl.
*G06F 8/654* (2018.01)
*G06F 8/61* (2018.01)

(52) U.S. Cl.
CPC .......... *G06F 8/654* (2018.02); *G06F 8/62* (2013.01)

(58) Field of Classification Search
CPC .................. G06F 8/62; G06F 8/654
See application file for complete search history.

(56) References Cited

U.S. PATENT DOCUMENTS

| 8,386,763 | B1 | 2/2013 | Spangler et al. |
| 8,635,590 | B1 | 1/2014 | Ogilvie |
| 10,078,510 | B1 | 9/2018 | Powers et al. |
| 2006/0036809 | A1* | 2/2006 | Rudd ............. G06F 12/0875 711/151 |

(Continued)

FOREIGN PATENT DOCUMENTS

| CN | 104090777 A | 10/2014 |
| GB | 2445303 A | 7/2008 |

*Primary Examiner* — Wei Y Zhen
*Assistant Examiner* — Brahim Bourzik
(74) *Attorney, Agent, or Firm* — Knobbe, Martens, Olson & Bear, LLP

(57) ABSTRACT

According to examples, an apparatus may include a processor that may delete portions of firmware instructions responsive to an indication that the portions should be disabled. To facilitate the foregoing, the firmware instructions may be deployed in a segmented architecture stored in respective regions of a storage device. The regions may include a metadata region, a main region, and excludable regions. The metadata region may store metadata that describes the structure of the firmware instructions and/or the various other regions. The main region may store core firmware instructions that may not be deleted. Each excludable region may store respective excludable firmware instructions. Each excludable firmware instructions may be associated with a flag that indicates whether or not the instructions should be disabled. If so, the corresponding excludable region in the storage device is identified and the contents may be removed, permanently disabling the excludable firmware instructions that were stored there.

13 Claims, 7 Drawing Sheets

(56) References Cited

U.S. PATENT DOCUMENTS

| | | |
|---|---|---|
| 2006/0259878 A1 | 11/2006 | Killian et al. |
| 2007/0055872 A1 | 3/2007 | Soga et al. |
| 2008/0168564 A1* | 7/2008 | Lerouge .................. G06F 21/64 726/26 |
| 2008/0244506 A1 | 10/2008 | Killian et al. |
| 2009/0132795 A1 | 5/2009 | Vlasov |
| 2010/0262953 A1 | 10/2010 | Barboni et al. |
| 2010/0281080 A1 | 11/2010 | Rajaram et al. |
| 2015/0234652 A1* | 8/2015 | Naveh ................... G06F 8/4435 717/121 |
| 2015/0317326 A1* | 11/2015 | Bandarupalli ...... G06F 16/1734 707/813 |
| 2016/0321036 A1* | 11/2016 | Schnepper ................ G06F 8/61 |
| 2017/0115963 A1 | 4/2017 | Stewart et al. |
| 2017/0262276 A1* | 9/2017 | Zongker ................. G06F 8/658 |
| 2018/0039490 A1* | 2/2018 | Gass ......................... G06F 8/65 |

\* cited by examiner

COMPUTER-READABLE MEDIUM
500

OBTAIN METADATA FROM A STORAGE DEVICE
502

OBTAIN A FIRST FLAG AND A SECOND FLAG
504

OBTAIN AN EXECUTION ORDER FROM THE METADATA, THE EXECUTION ORDER INDICATING AN ORDER IN WHICH CORE FIRMWARE INSTRUCTIONS, FIRST EXCLUDABLE FIRMWARE INSTRUCTIONS, AND SECOND EXCLUDABLE FIRMWARE INSTRUCTIONS ARE TO BE EXECUTED
506

EXECUTE, BASED ON THE EXECUTION ORDER: THE CORE FIRMWARE INSTRUCTIONS; THE FIRST EXCLUDABLE FIRMWARE INSTRUCTIONS WHEN THE FIRST FLAG INDICATES THAT THE FIRST EXCLUDABLE FIRMWARE INSTRUCTIONS ARE ENABLED; AND THE SECOND EXCLUDABLE FIRMWARE INSTRUCTIONS CODE WHEN THE SECOND FLAG INDICATES THAT THE SECOND EXCLUDABLE FIRMWARE INSTRUCTIONS ARE ENABLED
508

*FIG. 5*

DELETION OF FIRMWARE INSTRUCTIONS

BACKGROUND

Firmware instructions may have enhanced features (such as stolen device recovery features) that are deemed necessary for some users, but may pose a security risk or attack surface for others.

BRIEF DESCRIPTION OF THE DRAWINGS

Features of the present disclosure may be illustrated by way of example and not limited in the following figure(s), in which like numerals indicate like elements, in which:

FIG. 5 depicts a block diagram of an example non-transitory machine-readable storage medium for executing firmware instructions that incudes core firmware instructions and excludable firmware instructions.

DETAILED DESCRIPTION

Figure 1A:
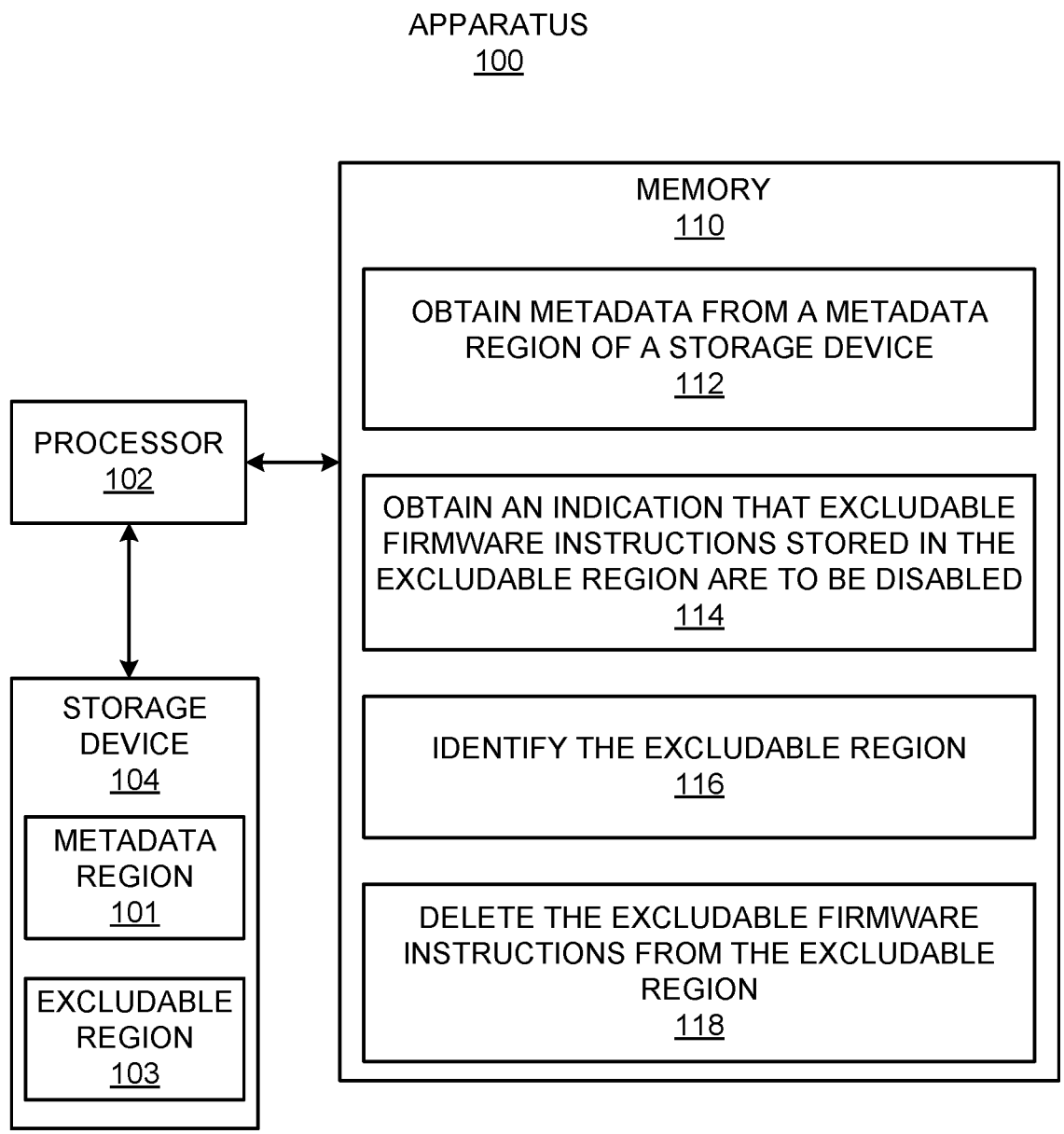
FIG. 1A shows a block diagram of an example apparatus that deletes excludable firmware instructions.

Firmware instructions such as Basic Input/Output System code, Unified Extensible Firmware Interface (UEFI), and/or other instructions boot up or otherwise initialize a device to operate. Some firmware instructions may have enhanced features (such as stolen device recovery features) that are deemed necessary for some users, but may pose a security risk or bigger attack surface for others.

When the enhanced features are not desired, portions of the firmware instructions having enhanced features may become unwanted instructions or unneeded instructions. Since the firmware instructions may be configured as embedded instructions and may not be able to be removed easily, unwanted or unneeded instructions may create a security risk. While multiple versions of the firmware instructions may be developed, one with and one without the portions of firmware instructions having the enhanced feature(s), this may be technically impractical and infeasible.

Disclosed herein are apparatuses and methods for disabling unwanted or unneeded firmware instructions, with minimal or no effect on core firmware functionality or security, by deleting the unwanted or unneeded firmware instructions. For example, deleting unwanted or unneeded firmware instructions may have minimal or no effect on the core firmware functionality or security when the core firmware functionality is able to execute as if the unwanted or unneeded firmware instructions were not deleted. Generally speaking, as described herein, "firmware instructions" may include instructions that are used for the functioning of an apparatus on which the firmware instructions are installed. For example, the firmware instructions may be used for interfacing with hardware components of the apparatus. Firmware instructions are typically not deleted or otherwise removed once installed. Examples of firmware instructions include Basic Input/Output System (BIOS) code, Unified Extensible Firmware Interface (UEFI), and/or other instructions that are used for the functioning of an apparatus on which the instructions are installed. In these examples, the system disclosed herein may be implemented for BIOS code, UEFI code, and/or other code for booting a device with excludable portions of the BIOS code, UEFI code, and/or other code. The firmware instructions may be stored on a storage device (also referred to herein as "firmware storage"). The firmware storage may be dedicated storage space that stores the firmware instructions of an apparatus.

To facilitate removal of unwanted or unneeded firmware instructions, various examples disclosed herein may include a firmware architecture in which firmware instructions are grouped into core firmware instructions that may not be removed (because the core firmware instructions may be used for the functioning of an apparatus on which the core firmware instructions are installed) and excludable firmware instructions that may be removed. The firmware storage may be accordingly partitioned into multiple regions to accommodate the firmware architecture. For example, the firmware storage may include, among others, a metadata region, a main region, and an excludable region.

The metadata region may store metadata that describes the firmware architecture and the layout of the firmware architecture in the firmware storage. For instance, the metadata may include a pointer to a location in the firmware storage where the main region exists, a pointer to a location in the firmware storage where the excludable region exists, and/or other information relating to the firmware architecture. The pointer may include an offset and/or length of a region of the firmware storage. The metadata may further store user-defined flags or other indications that specify whether or not excludable firmware instructions have been disabled. If the flag specifies that excludable firmware instructions have been disabled, then the excludable firmware instructions may be deleted from the excludable region at which the excludable firmware instructions are stored. Furthermore, upon updating the firmware instructions, if the flag specifies that the excludable firmware instructions have been disabled, the excludable firmware instructions may not be updated, preventing unintentional re-imaging of that code through the update. The metadata may further store a mapping between an excludable region and excludable firmware instructions stored in the excludable region. In these examples, multiple excludable regions may be provided, each storing respective excludable firmware instructions. The mapping enables identification of an excludable region at which excludable firmware instructions are located.

The main region may store the core firmware instructions. The contents of the main region may be digitally signed and authenticated to prevent/detect tampering and verify the integrity of the core firmware instructions. The excludable region may correspond to excludable firmware instructions separate from the core firmware instructions. The contents of the excludable region may be digitally signed, hashed, and/or otherwise subjected to security processing for authentication to prevent/detect tampering and verify the integrity of the contents independently of the core firmware instructions. The excludable region may include a plurality of excludable regions, each excludable region storing corresponding excludable firmware instructions. Content of each of the excludable regions may be cryptographically signed. In some examples, a hash may be generated and securely stored for the content of each of the excludable regions. In some examples, each hash may be cryptographically signed. In examples, the signatures, hashes, and/or other security information may be used for authentication to prevent and detect tampering of each of the contents of the excludable regions.

By digitally signing the core firmware instructions and excludable firmware instructions independently of each other and separately storing the core firmware instructions and excludable firmware instructions in different regions of a firmware storage, the security of the core firmware instructions may be maintained while permitting users to remove unwanted excludable firmware instructions. For instance, because the core firmware instructions and excludable firmware instructions are separately stored and digitally signed, excludable firmware instructions may be removed without compromising the digital signature of the core firmware instructions. This technology improvement facilitates, for example, compliance with security or compliance policies that seek to minimize attack surfaces, including those directed to firmware instructions that may be unneeded or unwanted by an organization.

Figure 1B:
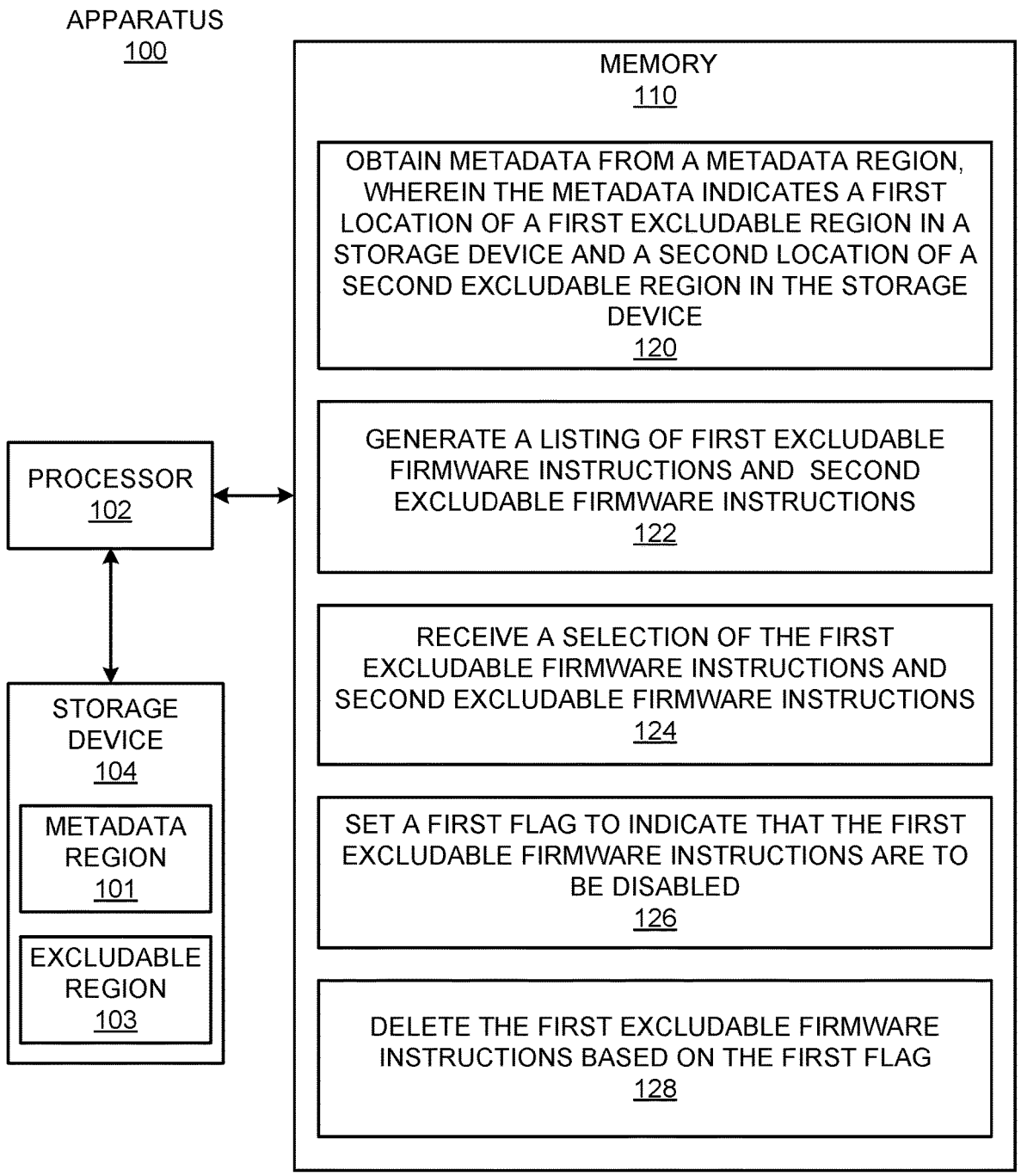
FIG. 1B shows a block diagram of an example apparatus that deletes excludable firmware instructions.

Reference is first made to FIGS. 1A and 1B, which each shows a block diagram of a respective example apparatus 100 that deletes excludable firmware instructions. It should be understood that the example apparatus 100 respectively depicted in FIGS. 1A and 1B may include additional features and that some of the features described herein may be removed and/or modified without departing from any of the scopes of the example apparatus 100.

The apparatus 100 shown in FIGS. 1A and 1B may be a computing device, a server, or the like. As shown in FIGS. 1A and 1B, the apparatus 100 may include a processor 102 that may control operations of the apparatus 100. The processor 102 may also be referenced herein as a controller and the apparatus 100 may be referenced herein as an electronic device. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

Figure 2A:
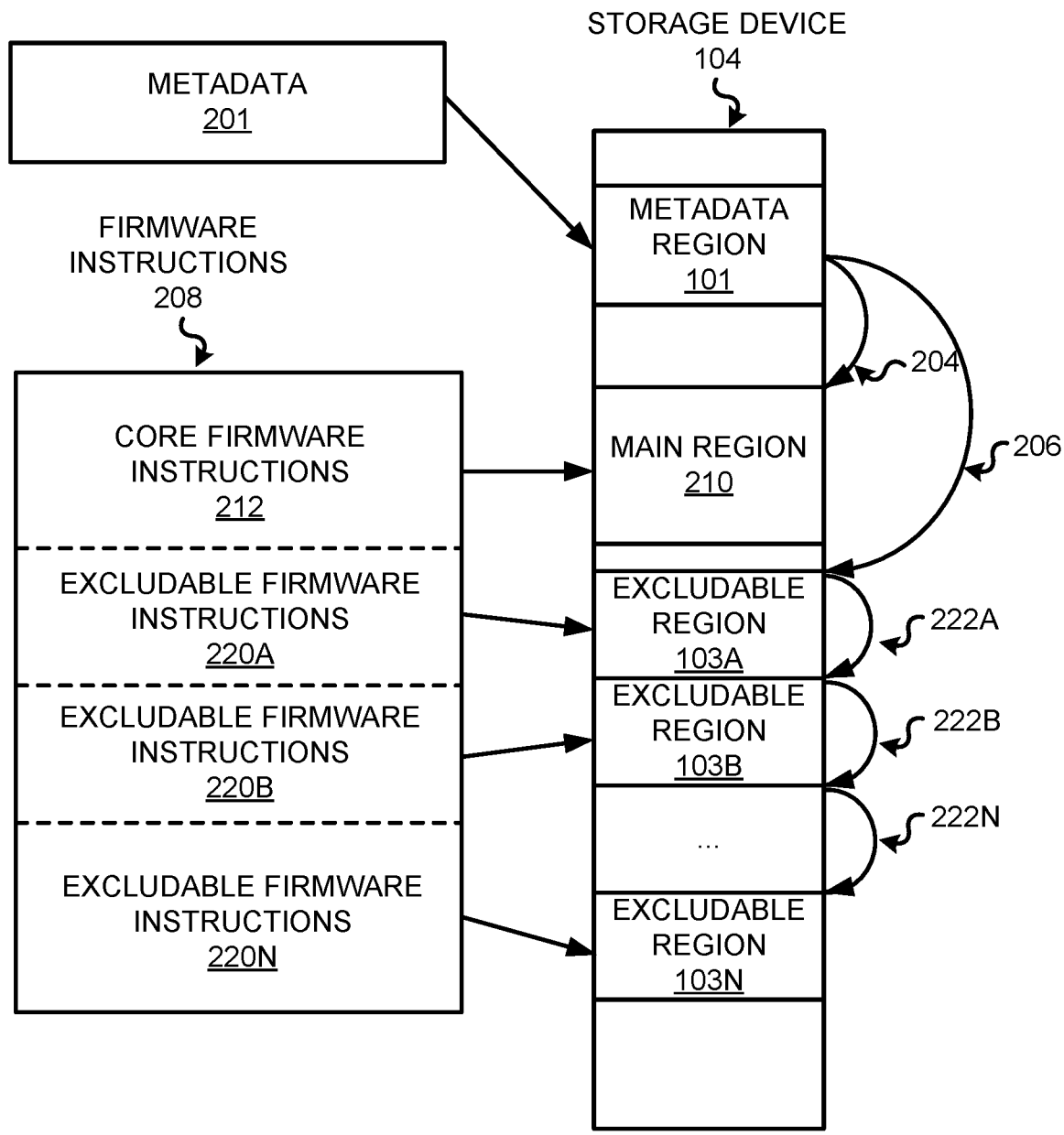
FIG. 2A shows a block diagram of an example storage device that includes different regions for storing metadata, core firmware instructions, and excludable instructions.
Figure 2B:
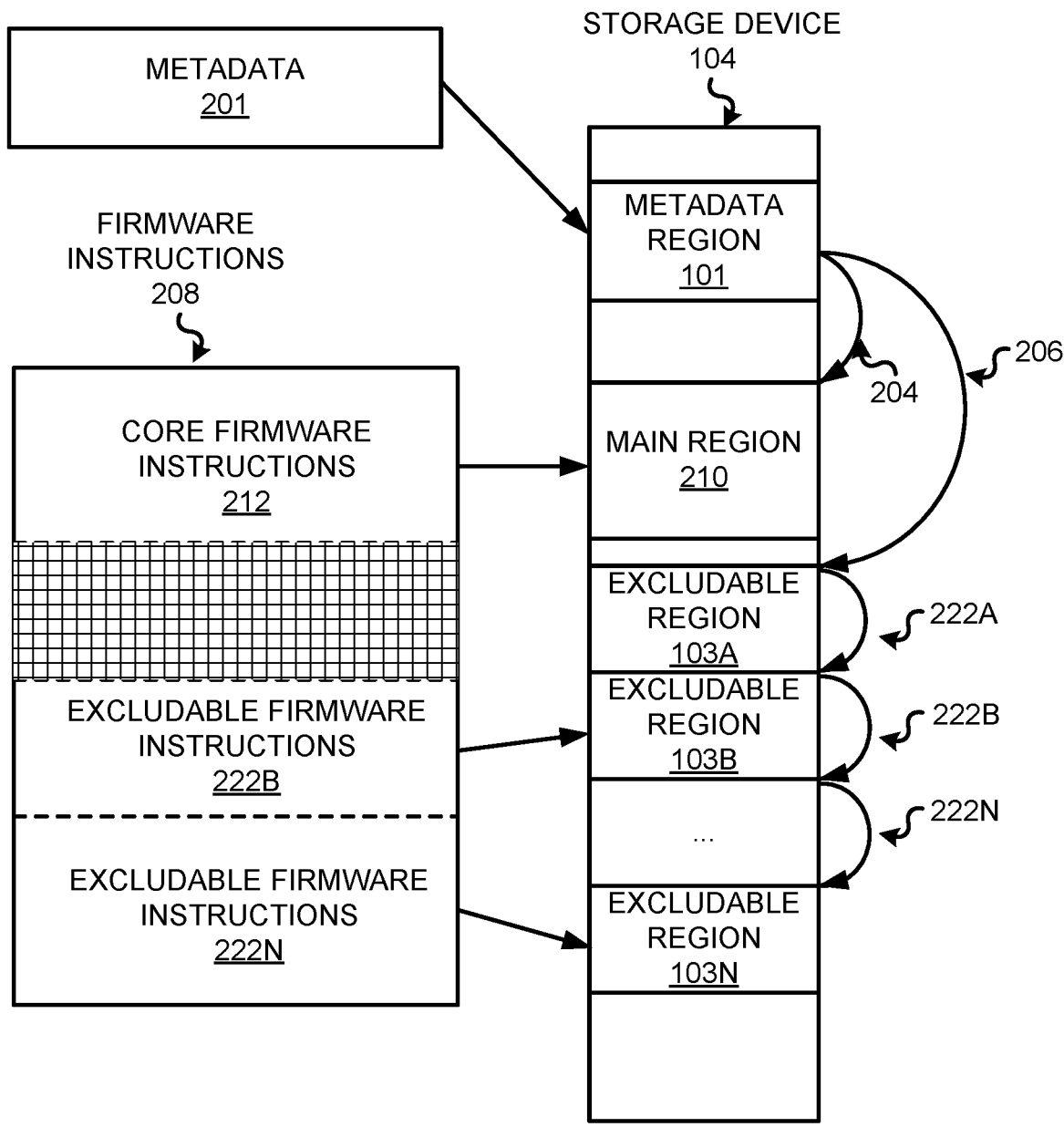
FIG. 2B shows a block diagram of an example storage device that includes deleted excludable instructions.

The apparatus 100 may include a memory 110 that may have stored thereon machine-readable instructions (which may also be termed computer readable instructions) 112-118 (FIG. 1A) and/or 120-128 (FIG. 1B) that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. The apparatus 100 may include a storage device 104, which may be firmware storage for storing firmware instructions for the apparatus 100. In some examples, the storage device 104 may include a Serial Peripheral Interface ("SPI") chip, embedded Multi-Media Card ("eMMC") memory, hard disk, solid state storage, or other device. The storage device 104 may include a metadata region 101 and an excludable region 103. Further examples of the storage device are illustrated in FIGS. 2A and 2B below. Although illustrated separately, the memory 110 may include the storage device 104. Furthermore, the instructions 112-118 and 120-128 may be part of or separate from the core firmware instructions disclosed herein. Attention will now turn to operations at processor 102 to delete excludable firmware instructions.

Referring to FIG. 1A, the processor 102 may fetch, decode, and execute the instructions 112 to obtain metadata from the metadata region 101. In examples, the metadata may indicate a location of the excludable region 103 in the storage device 104.

The processor 102 may fetch, decode, and execute the instructions 114 to obtain an indication that excludable firmware instructions stored in the excludable region 103 are to be disabled. In examples, the indication may include a flag in the metadata that has been set to indicate that the excludable firmware instructions are to be disabled. In these examples, the processor 102 may obtain the indication by reading the metadata to read the flag. The flag may include a binary (0/1; yes/no) setting and/or other value that indicates that the excludable firmware instructions are to be disabled. In some instances, the flag may be set responsive to a request or other indication to disable the excludable firmware instructions. The flag may be stored in various locations. In examples, different flag storage locations offer different levels of security. As such, the flag storage location may be configured according to particular needs depending on security requirements. This is because the flag may, as described herein, control whether or not data from an excludable region is deleted and continues to be deleted in some examples.

In examples, the flag may be stored in shared SPI, private SPI, one-time writable silicon such as a One-Time Password (OTP) storage, and/or other storage location. Shared SPI may be less secure than private SPI or OTP because Shared SPI may be electrically accessible to other system components. Depending on system configurations and requirements, shared SPI may be used to store the flag. Private SPI may be electrically-isolated from other system components. As such, the state of the private SPI may not be readily changed by outside systems or malware because of the electrical isolation of the Private SPI. OTP may include a permanent setting that cannot be changed. Though highly secure, the OTP device may be replaced if an apparatus employing the flag and the excludable regions described herein were re-processed to be sold as refurbished. On the other hand, a flag stored in a shared SPI or a private SPI may be reconfigured upon refurbishment.

The processor 102 may fetch, decode, and execute the instructions 116 to identify, based on the metadata, the excludable region 103. For example, the metadata may include a mapping between the excludable region and the excludable firmware instructions. The excludable region may be identified based on the mapping. In some examples, the mapping may facilitate generation of a catalog of excludable instructions that may be selected for inclusion or deletion from the firmware instructions. As such, the processor 102 may provide a listing of excludable instructions for selectable inclusion or deletion.

The processor 102 may fetch, decode, and execute the instructions 118 to delete the excludable firmware instructions from the excludable region 103. Thus, the excludable firmware instructions may be disabled by deletion from the excludable region 103. In examples, the metadata may include an offset and/or a length of the excludable region. To delete the excludable firmware instructions, the processor 102 may obtain the offset and the length of the excludable region from the metadata and delete data from the storage device 104 corresponding to the offset and the length.

In examples, the storage device 104 may include a main region (as will be described in more detail with respect to FIGS. 2A and 2B) that stores core firmware instructions that may not be removed. In these examples, the processor 102 may further receive an indication to update core firmware instructions, the core firmware instructions stored at the main region. For example, the core firmware instructions may receive an update that is pushed from a source to the apparatus 100 or is pulled by the apparatus 100 from the source.

In any event, responsive to the update, the processor 102 may determine that the flag is set to disable the excludable firmware instructions and update the core firmware instructions without an update to the excludable firmware instructions based on the determination that the flag is set to disable the excludable firmware instructions. In this manner, unintentionally rewriting an updated version of the deleted excludable firmware instructions may be avoided.

In examples, the processor 102 may implement measures that may secure the firmware instructions. For instance, the firmware instructions may be digitally signed by the processor 102 or source of the firmware instructions. Such digital signature may include cryptographic or other hashing techniques that may uniquely identify hashed data to detect tampering. Because excludable firmware instructions may be deleted, separate digital signatures for the core firmware instructions and the excludable firmware instructions may be generated and separately validated. For instance, a first digital signature for core firmware instructions may be generated and used to validate core firmware instructions separately from the excludable firmware instructions. Similarly, a second digital signature for the excludable firmware instructions may be generated and used to validate the excludable firmware instructions separately from the core firmware instructions.

In examples, the processor 102 may generate a hash of the firmware instructions (such as for the core firmware instructions and/or each excludable firmware instructions) and then may sign the hash. For example, a hash of each excludable code region may be stored in metadata, which may then be signed. At runtime, the processor 102 may validate the firmware instructions by validating the metadata signature, extracting the hash, then hashing the content of each appropriate region (such as the main region or excludable region) and comparing the hashed content to the extracted hash. A mismatch may indicate tampering. If excludable firmware instructions are disabled, the processor 102 may skip such hashing and simply ensure that the corresponding excludable region is actually excluded (such as by refraining from using the corresponding excludable firmware instructions and/or deleting the corresponding excludable region).

In this manner, excludable firmware instructions may be deleted with minimal to no effect on the security and validation of the core firmware instructions (and/or other excludable firmware instructions that are not deleted).

In examples, the processor 102 may implement measures that may secure the excludable regions. For example, the processor 102 may determine that data has been added to the excludable region after the excludable firmware instructions have been deleted. The processor 102 may then delete the data from the excludable region. In some instances, the processor 102 may periodically, on-demand, at firmware updates, and/or other times may consult the metadata to identify excludable regions of the storage device that are associated with disabled (deleted) excludable firmware instructions and delete data from those regions. As such, the processor 102 may periodically purge excludable regions that should not have data in those excludable regions.

In examples, the excludable region 103 includes a plurality of excludable regions. Each excludable region may store corresponding excludable firmware instructions and each may be individually disabled by deleting the excludable firmware instructions from the storage device 104. For example, the processor 102 may obtain an indication that the second excludable firmware instructions are to be disabled, identify the second excludable region corresponding to the second executable firmware instructions, and delete the second excludable firmware instructions from the second excludable region. Each excludable region may be identified based on a respective offset and/or location that corresponds to the excludable region. Additional details regarding the layout of the excludable regions are discussed with respect to FIGS. 2A and 2B.

Reference will now be made to operations relating to receiving selections of excludable firmware instructions to be disabled. Referring to FIG. 1B, the processor 102 may fetch, decode, and execute the instructions 120 to obtain metadata from the metadata region, wherein the metadata indicates a first location of the first excludable region in the storage device and a second location of the second excludable region in the storage device.

The processor 102 may fetch, decode, and execute the instructions 122 to generate a listing of first excludable firmware instructions and second excludable firmware instructions.

The processor 102 may fetch, decode, and execute the instructions 124 to receive a selection of the first excludable firmware instructions, the selection indicating that the first excludable firmware instructions are to be disabled.

The processor 102 may fetch, decode, and execute the instructions 126 to set a first flag to indicate that the first excludable firmware instructions are to be disabled responsive to the selection.

The processor 102 may fetch, decode, and execute the instructions 128 to delete the first excludable firmware instructions based on the first flag. In examples, the first excludable firmware instructions and the second excludable firmware instructions may be pre-installed at the storage device 104. The first flag may be set to indicate that the first excludable firmware instructions are enabled until disabled, and the second flag is set to indicate that the second excludable firmware instructions are enabled until disabled.

Reference will now be made to a more detailed view of a storage device 104 for storing firmware instructions. FIG. 2A shows a block diagram of an example storage device 104 that includes different regions (101, 210, 103A-N) for storing metadata 201, core firmware instructions 212, and excludable instructions 220A-N. The storage device 104 may include a metadata region 101, a main region 210, and a plurality of excludable regions 103A-N. The metadata region 101 may store metadata 201. The main region 210 may store core firmware instructions 212. The excludable regions 103A-N may each store corresponding excludable firmware instructions 220-N. The core firmware instructions 212 and the excludable firmware instructions 220-N together form the firmware instructions 208. The firmware instructions 208 may be used to boot or otherwise initialize an apparatus, such as apparatus 100. In the context of BIOS, UEFI, and/or other boot firmware instructions, in some examples, the main region 210 and excludable regions 103 may correspond to a Driver Execution Environment (DXE) location on the storage device 104. The architecture of the DXE location in the storage device 104 may be separated into different regions, such as the main region 210 and excludable regions 103A-N.

In examples, the metadata 201 may store a pointer 204 to the main region 210. The pointer 204 may indicate a location of the main region 210 in the storage device 104. The pointer 204 may include an offset and/or length of the main region 210. As such, the core firmware instructions 212 stored in the main region 210 may be obtained, such as to be booted during bootup of an apparatus, such as apparatus 100.

In examples, the metadata 201 may store a pointer 206 to the excludable region 103A. The pointer 206 may include an offset and/or length of the excludable region 103A. As such, the excludable firmware instructions 220A stored in the excludable region 103A may be obtained, such as to be booted during bootup of an apparatus, such as apparatus 100. Additionally, the excludable firmware instructions 220A stored in the excludable region 103A may be deleted from the storage device 104 based on the pointer 206.

In examples, previous excludable regions may serially point to subsequent excludable regions 103 (such as excludable regions 103B-N). For example, the excludable region 103A may include a pointer 222A that includes information used to locate the next excludable region 103 (in this case, excludable region 103B). For example, the pointer 222A may indicate an offset, length, and/or other location indicator of the next excludable region 103. Alternatively or additionally, the pointer 222A may include a length of the current excludable region 103 so that the offset of the next excludable region may be calculated. Thus, the excludable regions 103 may be serially laid out next to one another on the storage device 104. Likewise, excludable regions 103B,N may each include a pointer 222B, 222N that includes information used to locate the next excludable region 103. For instance, the pointers 222B, 222N may each indicate an offset, length, and/or other location indicator of the next excludable region 103, and so on. In this manner, a linked array of excludable regions may be laid out on the storage device 104. Alternatively or additionally, the metadata 201 may individually store each of the pointers 222A-N (as well as the pointers 204 and 206).

FIG. 2B shows a block diagram of an example storage device 104 that includes deleted excludable instructions. For example, with reference back to FIG. 2A, excludable firmware instructions 220A has been disabled and therefore deleted from the storage device 104, as illustrated by the cross-hatching. Specifically, the excludable firmware instructions 220A have been deleted from the excludable region 103A. However, the pointer 222A has been maintained so that the next excludable region 103 (excludable region 103B) may be located.

It should be noted that like reference symbols between FIGS. 2A and 2B (and throughout the drawing figures) represent similar drawing elements. It should be noted that the particular number of excludable firmware instructions and excludable regions shown in FIGS. 2A and 2B are for illustrative purposes. Other numbers may be used as appropriate. Furthermore, the storage device 200 shown in FIGS. 2A and 2B may be part of the memory 110 or may be separate from the memory 110.

Figure 3:
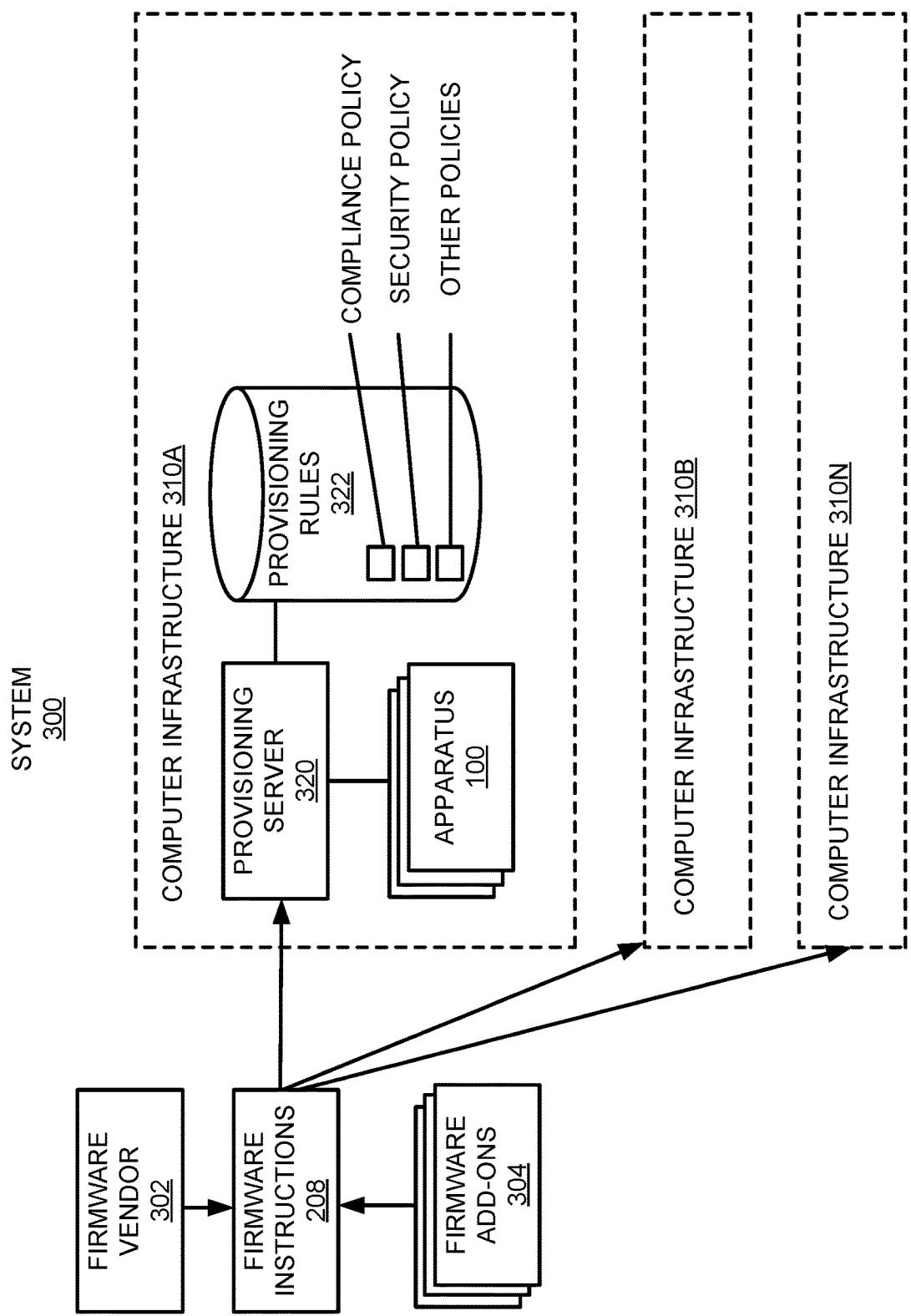
FIG. 3 shows a block diagram of an example system that provisions firmware instructions, including core firmware instructions and excludable firmware instructions.

FIG. 3 shows a block diagram of an example system 300 that provisions firmware instructions, including core firmware instructions and excludable firmware instructions. A firmware vendor 302 may provide firmware instructions 208. The various components of system 300 may be coupled to one another via a computer network such as, for example, a local area network (LAN), a virtual LAN (VLAN), a wireless local area network (WLAN), a virtual private network (VPN), the Internet, or the like, or a combination thereof. In examples, the firmware instructions 208 may be part of the apparatus 100 offered by the firmware vendor 302. Various third parties may supply firmware add-ons 304. Each of these firmware add-ons 304 may be incorporated into the firmware instructions 208. In examples, a firmware add-on 304 may be incorporated into the firmware instructions 208 as an excludable firmware instruction 220 by the firmware vendor 302.

The firmware vendor 302 may provide the firmware instructions 208 for consumption within a computer infrastructure 310. Multiple computer infrastructures 310A-N are shown but only one (computer infrastructure 310A) is shown in detail for convenience. The computer infrastructure 310 may include a provisioning server 320 used to deploy apparatus 100 based on provisioning rules 322. The provisioning rules 322 may include a compliance policy, a security policy, and/or other policies that dictate the configuration, security, or other operational characteristics of the apparatus 100.

An entity may operate each computer infrastructure 310. As such, each entity may control whether and which firmware instructions execute on a given apparatus 100 within the computer infrastructure 310 based on the provisioning rules 322. In some examples, the provisioning server 320 may facilitate firmware instruction updates to the apparatuses 100 within the computer infrastructure 310. As such, the provisioning server 320 may facilitate updates to the firmware instructions as disclosed herein. It should be noted that the provisioning server 320 (though not illustrated) may include a processor, such as processor 102, that may perform some or all of the operations of apparatus 100 to delete excludable firmware instructions from an apparatus.

Figure 4:
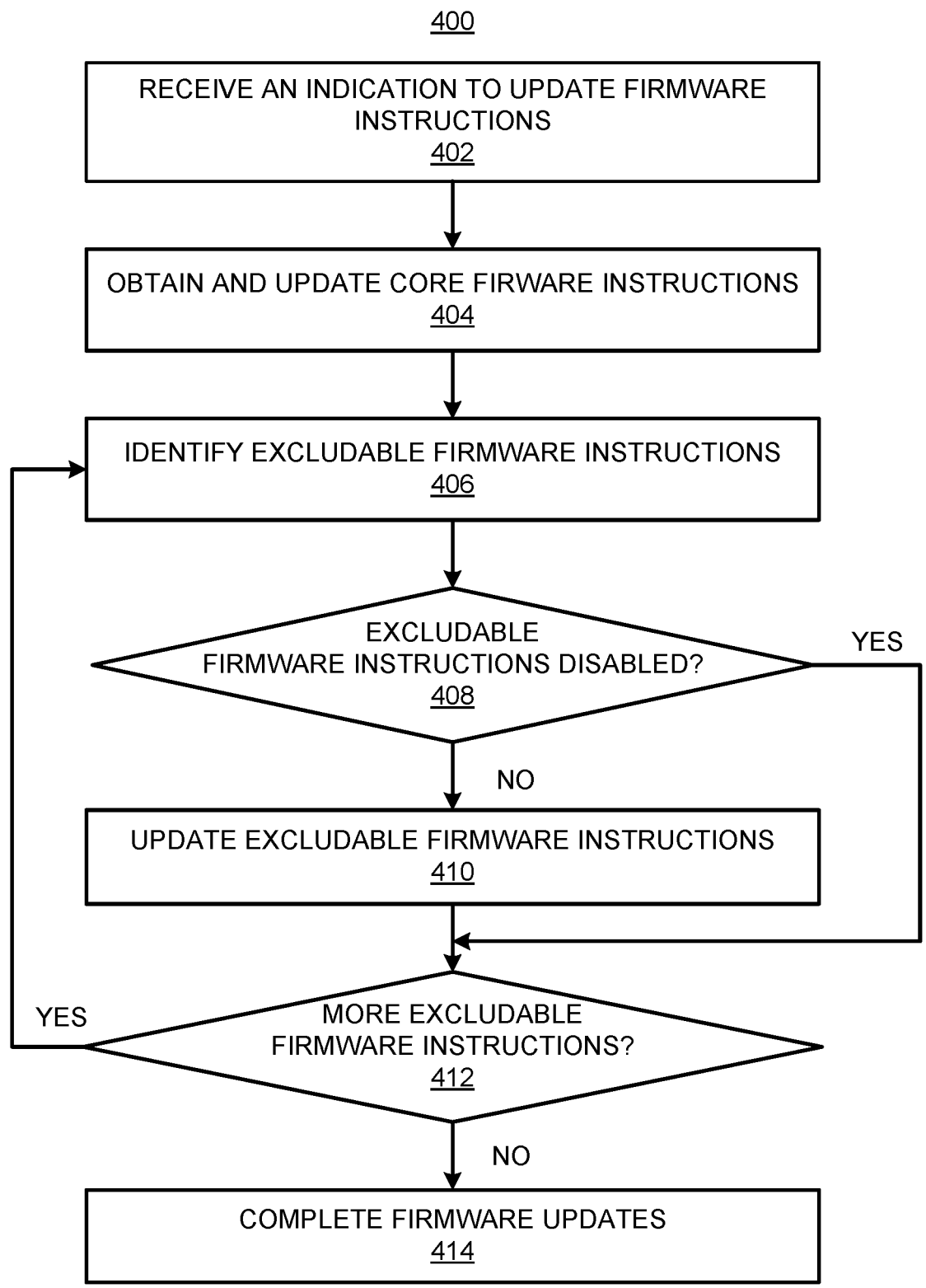
FIG. 4 depicts a flow diagram of an example method for updating firmware instructions in the presence of deleted excludable firmware instructions.

Various manners in which the apparatus 100 may operate to update firmware instructions are discussed in greater detail with respect to the method 400 depicted in FIG. 4. It should be understood that the method 400 may include additional operations and that some of the operations described therein may be removed and/or modified without departing from the scopes of the method 400. The description of the method 400 is made with reference to the features depicted in FIGS. 1A-3 for purposes of illustration.

FIG. 4 depicts a flow diagram of an example method for updating firmware instructions in the presence of deleted excludable firmware instructions.

As shown in FIG. 4, at block 402, the processor 102 may receive an indication to update firmware instructions, such as firmware instructions 208. The update may be facilitated by an updater or installer, such as a BIOS or UEFI updater or installer. In some examples, the update may include an update to the core firmware instructions and to the excludable firmware instructions.

At block 404, the processor 102 may update core firmware instructions.

At block 406, the processor 102 may identify excludable firmware instructions. For example, the processor 102 may access metadata that specifies the excludable firmware instructions.

At block 408, the processor 102 may determine whether the excludable firmware instructions are disabled. For example, the processor 102 may consult a flag for the excludable firmware instructions that indicates whether the excludable firmware instructions have been disabled. If the excludable firmware instructions are disabled, then the processor 102 may skip to block 412, where a determination of whether more excludable firmware instructions are available is made. In this manner, if the update includes excludable firmware instructions that have been disabled (deleted at an apparatus such as apparatus 100), then the update for the excludable firmware instructions may be skipped. In some examples, the processor 102 may delete data from the excludable region corresponding to the disabled excludable firmware instructions to ensure that malware or other data that should not be present is removed. As such, each apparatus may update only excludable firmware instructions that have not been disabled even if the update includes an update to the disabled excludable firmware instructions. This may make global updates more efficient since the updates may include updates to all firmware instructions without regard to whether a particular apparatus has disabled excludable firmware instructions.

At block 410, the processor 102 may, responsive to a determination that the excludable firmware instructions are not disabled, update the excludable firmware instructions. For example, the processor 102 may identify the excludable firmware instructions to be updated, identify a location on firmware storage (such as storage device 104) at which the excludable firmware instructions are stored (such as an excludable region 103) and write the update files to the appropriate location. In some instances, a signature for the updated excludable firmware instructions may be obtained and stored for later validation.

At block 412, the processor 102 may determine whether more excludable firmware instructions are available. If so, then the processor 102 may return to block 406, where the next excludable firmware instructions are identified.

At block 414, the processor 102 may complete the firmware updates responsive to a determination that no more excludable firmware instructions are available.

Some or all of the operations set forth in the method 400 may be included as utilities, programs, or subprograms, in any desired computer accessible medium. In addition, the method 400 may be embodied by computer programs, which may exist in a variety of forms. For example, some operations of the method 400 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIG. 5 depicts a block diagram of an example non-transitory computer-readable medium 500 for executing firmware instructions that incudes core firmware instructions and excludable firmware instructions. The non-transitory computer-readable medium 500 may be an electronic, magnetic, optical, or other physical storage device that includes or stores executable instructions. The non-transitory computer-readable medium 500 may be, for example, Random Access memory (RAM), an Electrically Erasable Programmable Read-Only Memory (EEPROM), a storage device, an optical disc, and the like. The non-transitory computer-readable medium 500 may have stored thereon machine-readable instructions 502-508 that a processor, such as the processor 102, may execute.

In various examples, the non-transitory machine-readable medium 500 may boot up a device, such as apparatus 100, using core firmware instructions and excludable firmware instructions that have not been disabled. In these examples, the machine-readable instructions 502-508 may operate to obtain and execute the core firmware instructions and excludable firmware instructions to boot up the device. Other example uses of machine-readable instructions 502-508 may be implemented as well.

The machine-readable instructions 502 may cause the processor to obtain metadata from a storage device, such as storage device 104.

The machine-readable instructions 504 may cause the processor to obtain a first flag and a second flag. The first flag and/or the second flag may be stored in a secure location of the storage device.

The machine-readable instructions 506 may cause the processor to obtain an execution order from the metadata, the execution order indicating an order in which core firmware instructions, first excludable firmware instructions, and second excludable firmware instructions are to be executed.

The machine-readable instructions 508 may cause the processor to execute, based on the execution order: the core firmware instructions, the first excludable firmware instructions when the first flag indicates that the first excludable firmware instructions are enabled, and the second excludable firmware instructions code when the second flag indicates that the second excludable firmware instructions are enabled. It should be noted that when the first flag and/or the second flag indicates that corresponding excludable firmware instructions are disabled, the corresponding excludable firmware instructions have been or will be deleted at boot up, update, and/or other times.

In some examples, the firmware instructions may be individually verified before execution using security information such as a known-good signature. For instance, a known-good signature for the core firmware instructions may be stored and matched with a current signature of the core firmware instructions to verify the core firmware instructions have not been tampered with. Likewise, a known-good signature for each excludable firmware instruction may be stored and matched with a current signature of each excludable firmware instruction to verify each of the excludable firmware instructions have not been tampered with as well. As previously noted, separate signature verification may permit deletion of a given excludable firmware instruction. Other types of security information such as a hash contained in signed metadata corresponding to contents of a main or excludable region, a hash of the contents of the main or excludable region, and/or other data may be used as well.

The systems, methods, and computer readable media described herein may facilitate various uses and models of distributing firmware instructions, such as firmware instructions 208. For example, a vendor, such as firmware vendor 302 (which may produce apparatus 100 embedded with or otherwise included with the firmware instructions), may offer different functionalities encoded through excludable firmware instructions, such as excludable firmware instructions 220. Consumers, such as entities that operate computer infrastructure 310, may elect some or all of these functionalities, in which case they may be provided with corresponding excludable firmware instructions. Otherwise, the vendor may remove the corresponding excludable firmware instructions prior to providing the firmware instructions. This may make distribution of the firmware instructions easier and facilitates different models of such distribution.

In other examples, if the consumer has paid for or otherwise acquired a service or functionality provided by excludable firmware instructions but no longer needs or wants such functionality, then the corresponding excludable firmware instructions may be removed using the systems, methods, computer readable media described herein.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. For example, although described in the context of boot-level initialization, the features and functions described herein may be used in other contexts.

For simplicity and illustrative purposes, the present disclosure may be described by referring mainly to examples. In the preceding description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a physical storage device including:
      a metadata region to store first metadata related to firmware of the apparatus, wherein the firmware includes core firmware instructions that are restricted from being deleted from the physical storage device and first excludable firmware instructions that are allowed to be deleted from the physical storage device,
      a main region to store the core firmware instructions, and
      a first excludable region to store the first excludable firmware instructions separate from the core firmware instructions; and
   a processor in communication with the physical storage device, wherein the processor is to:
      obtain the first metadata from the metadata region, wherein the first metadata obtained from the metadata region includes:
         information defining a first location, in the physical storage device, of the first excludable region, and
         a flag indicating that the first excludable firmware instructions stored in the first excludable region of the physical storage device are to be disabled;
      determine that the flag is set to disable the first excludable firmware instructions;
      identify the first excludable region of the physical storage device at the first location indicated in the first metadata;
      delete, from the physical storage device, the first excludable firmware instructions stored in the first excludable region identified at the first location indicated in the first metadata;
      receive an indication to update the core firmware instructions; and
      based on the determining that the flag is set to disable the first excludable firmware instructions, update the core firmware instructions stored in the main region of the physical storage device without an update to the first excludable firmware instructions stored in the first excludable region of the physical storage device.

2. The apparatus of claim 1, wherein the processor is further to:
   receive an indication to disable the first excludable firmware instructions; and
   in response to receiving the indication to disable the first excludable firmware instructions, set the flag to disable the first excludable firmware instructions.

3. The apparatus of claim 2, wherein the processor is further to:
   determine that data has been added to the first excludable region after the first excludable firmware instructions have been deleted; and
   delete the data from the first excludable region of the physical storage device.

4. The apparatus of claim 1, wherein the processor is further to:
   generate a first digital signature for the core firmware instructions, wherein the first digital signature is used to verify integrity of the core firmware instructions; and
   generate a second digital signature for the first excludable firmware instructions, wherein the second digital signature is used to verify the integrity of the first excludable firmware instructions independently of verifying the integrity of the core firmware instructions.

5. The apparatus of claim 1, wherein the first metadata obtained from the metadata region indicates the first location of the first excludable region with a first offset and a first length, and wherein to delete the first excludable firmware instructions, the processor is further to:
   delete data from the physical storage device corresponding to the first offset and the first length.

6. The apparatus of claim 5, wherein the physical storage device comprises a second excludable region that stores second excludable firmware instructions, and wherein the processor is further to:
   obtain second metadata from the metadata region, wherein the second metadata obtained from the metadata region includes:
      information defining a second location, in the physical storage device, of the second excludable region, and
      information indicating that the second excludable firmware instructions stored in the second excludable region of the physical storage device are to be disabled;
   identify the second excludable region of the physical storage device at the second location indicated in the second metadata; and
   delete, from the physical storage device, the second excludable firmware instructions stored in the second excludable region identified at the second location indicated in the second metadata.

7. The apparatus of claim 6, wherein to identify the second excludable region, the processor is further to:

identify, based on the second metadata, a second offset of the second excludable region of the physical storage device corresponding to the second excludable firmware instructions.

8. The apparatus of claim 6, wherein to identify the second excludable region, the processor is further to:
determine that the second excludable region is after the first excludable region on the physical storage device, wherein the second excludable region is identified based on the first offset and the first length of the first excludable region.

9. The apparatus of claim 1, wherein the first metadata obtained from the metadata region includes a mapping between the first excludable region of the physical storage device and the first excludable firmware instructions, and wherein the processor is further to generate, from the mapping, a list of excludable firmware instructions from which the first excludable firmware instructions are selected for deletion.

10. An apparatus comprising:
a physical storage device including:
a metadata region to store metadata related to firmware of the apparatus, wherein the firmware includes:
core firmware instructions that are restricted from being deleted from the physical storage device,
first excludable firmware instructions that are allowed to be deleted from the physical storage device, and
second excludable firmware instructions that are allowed to be deleted from the physical storage device;
a main region to store the core firmware instructions,
a first excludable region to store the first excludable firmware instructions separate from the core firmware instructions, and
a second excludable region to store the second excludable firmware instructions separate from the core firmware instructions; and
a processor in communication with the physical storage device, wherein the processor is to:
obtain metadata from the metadata region, wherein the metadata obtained from the metadata region includes:
first flag information defining a first location, in the physical storage device, of the first excludable region, and
second flag information defining a second location, in the physical storage device, of the second excludable region;
receive a selection indicating that the first excludable firmware instructions are to be disabled;
set a first flag to indicate that the first excludable firmware instructions are to be disabled responsive to the selection;
determine that the first flag is set to disable the first excludable firmware instructions;
receive an indication to update the core firmware instructions; and
based on the determining that the first flag is set to disable the first excludable firmware instructions:
delete, from the physical storage device, the first excludable firmware instructions stored in the first excludable region identified at the first location indicated in the metadata; and
update the core firmware instructions stored in the main region of the physical storage device without updating the first excludable firmware instructions stored in the first excludable region of the physical storage device.

11. The apparatus of claim 10, wherein the first excludable firmware instructions and the second excludable firmware instructions are pre-installed at the physical storage device, the first flag is set to indicate that the first excludable firmware instructions are enabled until disabled, and a second flag is set to indicate that the second excludable firmware instructions are enabled until disabled.

12. A non-transitory computer-readable medium comprising machine-readable instructions that when executed by a controller of an electronic device, cause the controller to:
obtain metadata from a physical storage device that stores firmware of the electronic device, wherein:
the firmware includes core firmware instructions that are restricted from being deleted from the physical storage device, first excludable firmware instructions that are allowed to be deleted from the physical storage device, and second excludable firmware instructions that are allowed to be deleted from the physical storage device,
wherein the core firmware instructions are stored in a main region of the physical storage device separately from the first excludable firmware instructions and the second excludable firmware instructions, and
the metadata includes:
information defining a first flag indicating whether the first excludable firmware instructions are enabled,
information defining a second flag indicating whether the second excludable firmware instructions are enabled, and
information defining an execution order indicating an order in which the core firmware instructions, the first excludable firmware instructions, and the second excludable firmware instructions are to be executed;
when the first flag indicates that the first excludable firmware instructions are enabled and the second flag indicates that the second excludable firmware instructions are enabled, execute, based on the execution order included in the metadata obtained from the physical storage device:
the core firmware instructions;
the first excludable firmware instructions; and
the second excludable firmware instructions; and
when the first flag indicates that the first excludable firmware instructions are disabled, update the core firmware instructions stored in the main region of the physical storage device without updating the first excludable firmware instructions.

13. The non-transitory computer-readable medium of claim 12, comprising further machine-readable instructions that, when executed by the controller of the electronic device, cause the controller to:
delete the first excludable firmware instructions from a first excludable region of the physical storage device when the first flag indicates that the first excludable firmware instructions are disabled; and
delete the second excludable firmware instructions from a second excludable region of the physical storage device when the second flag indicates that the second excludable firmware instructions are disabled.

* * * * *